Mar. 6, 1923.

M. DAVID

BEEHIVE

Filed June 3, 1922

Inventor
Michael David,

By Watson E. Coleman
Attorney

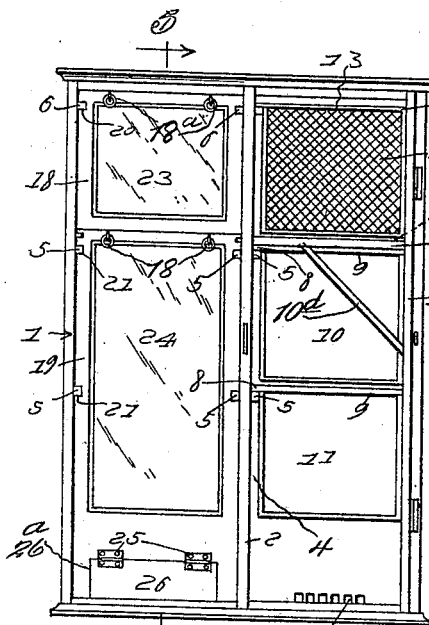

Patented Mar. 6, 1923.

1,447,713

UNITED STATES PATENT OFFICE.

MICHAEL DAVID, OF PITTSBURGH, PENNSYLVANIA.

BEEHIVE.

Application filed June 3, 1922. Serial No. 565,640.

*To all whom it may concern:*

Be it known that I, MICHAEL DAVID, a citizen of Rumania, residing at Pittsburgh, in the county of Allegheny and State of Pennsylvania, have invented certain new and useful Improvements in Beehives, of which the following is a specification, reference being had to the accompanying drawings.

In the art of bee culture, the present invention has for its purpose the provision of a beehive adapted for the colonization in breeding of bees, a breedery being provided for housing two families of bees, and to bring about an artificial hatchery.

Another purpose is to provide a beehive for double breeding, including honey, breeding and feeding rooms, there being entrance holes or apertures, each being large enough for one bee at a time to enter, thus insuring against the entrance of mice and butterflies, in combination with shutters or closures to cover said entrance holes or apertures, to insure against loss of bees during transportation.

Still another purpose is to provide a breedery or beehive for one or more families of bees, wherein the feeding rooms are constructed and arranged for more convenient feeding of the bees, so as not to disturb the bees at work or during their winter sleep.

A further purpose is to provide a beehive, wherein provision is made for the support of the honey comb frames and other frames in the compartments of the beehive, so that the honey comb frames can be easily removed and adjusted, provision being made for spacing the honey comb frames upon their supporting means.

A still further purpose is the provision of closures having glass or other transparent panels to close the honey, breeding and feeding rooms, and through which the bees may be observed at work, without disturbance to the bees, said closures with their transparent panels being mounted upon the same supports upon which the honey comb frames are mounted.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 3 is a view in elevation, showing the hinged closures at the rear open, and thereby showing the glass paneled closures of one compartment in place, while those of the other compartment are removed, for the purpose of showing the honey, breeding and feeding rooms;

Figure 5 is a vertical section view through the beehive or breeder upon line 5—5 of Figure 3;

Fig. 6 is a side view;

Figure 8 is a detail view of one of the glass paneled closures of one of the compartments.

Figure 1:
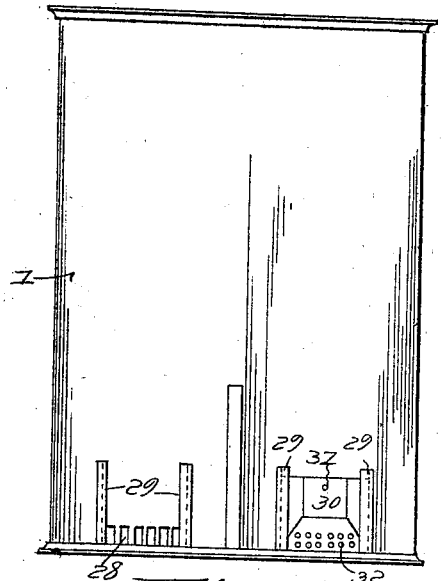
Figure 1 is a view in front elevation of the improved beehive or breeder constructed in accordance with the invention.
Figure 2:
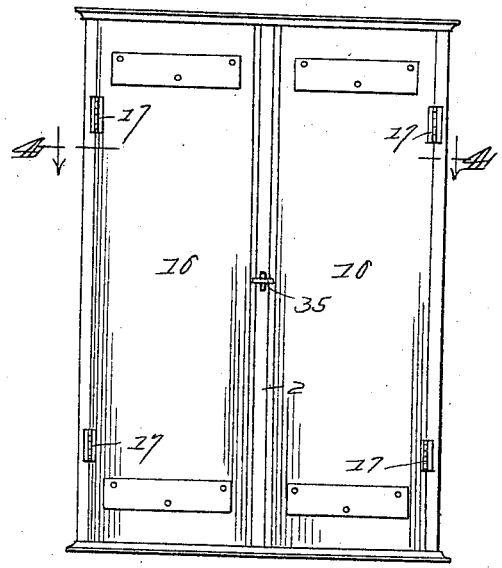
Figure 2 is a rear view of the same, showing the closures, which may be opened, for gaining access to the interior of the hive.
Figure 7:
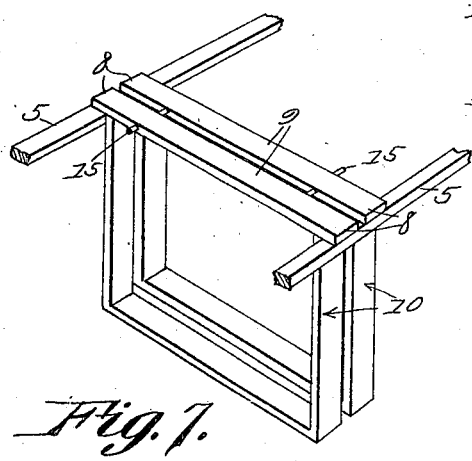
Figure 7 is a detail view on one or two of the honey comb frames mounted upon the supports or runners.

Referring to the drawings, 1 designates a beehive or breeder housing, which may be any suitable proportion and any convenient construction, preferably as shown.

Figure 4:
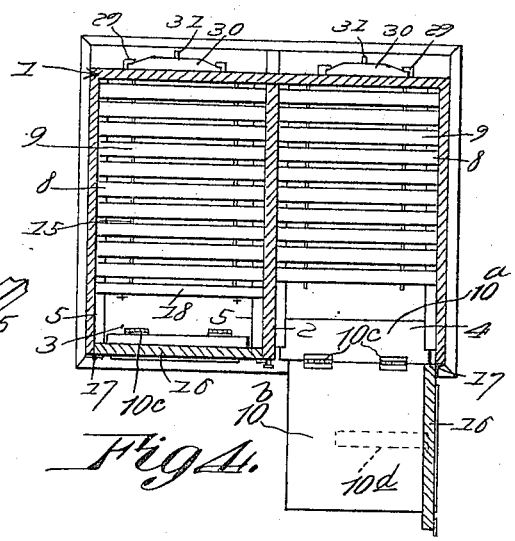
Figure 4 is a horizontal sectional view on line 4—4 of Figure 2, showing one of the doors 16 open.

This housing is provided with a vertical centrally located partition 2, which subdivides the housing in two compartments 3 and 4. Each compartment extends the full height of the housing or casing, and secured to the opposite side walls of these compartments are cleats or runners 5 and 6. These runners constitute supports. Arranged upon and engaged with the supports 5 are the lateral extensions 8 of the upper rails 9 of the frames 10 and 11. The lower frames 11 are supported in the lower portion of the compartment, so as to provide breeding rooms for the bees, whereas the frames 10 are supported upon the upper cleats or runners 5, for the purpose of providing additional room for the bees. Arranged in the upper parts of the compartments 3 and 4 are honey comb frames 12, the upper rails 13 of which have extensions 14, which are supported upon the runners or supports 6. The honey comb frames 12, as well as the frames 10 and 11, as shown clearly in Figures 4 and 7 are provided with laterally projecting nails or lugs 15, for the purpose of spacing the frames in their relative positions, whereby the bees may pass between the frames.

In order to close the compartments 3 and 4, other than being closed by the hinged doors 16 (which are hinged at 17), upper and lower closures 18 and 19 are provided. These closures 18 and 19 are arranged in the compartments 3 and 4, and are spaced inwardly from the doors 16, to not only provide additional space between the closures 18 and 19 and the doors, but also for the purpose of holding the honey comb and other frames for the bees securely in place, so that the spacing projections or lugs may engage the opposite frames, such as the honey comb frames.

The closures 18 and 19 are provided with notches or recesses 20 and 21, for the purpose of engaging the cleats or runners 5 and 6, on which the extensions of the honey comb or other frames are engaged. The closures 18 and 19 are provided with glass or other transparent panels 23 and 24, enabling the bees to be easily observed therethrough without disturbing them, and also to prevent hindering them during their winter sleep.

The lower portion of each closure 19 has an opening $26^a$, in which a door 26 is hingedly mounted as at 25. This door is designed for closing the opening $26^a$, when it is suspended perpendicularly in the opening. However when the door is swung open and propped in such position ingress and egress of the bees are permitted. The door is also provided to permit the bees to feed, either in front of the closure 19, or to the rear thereof, more properly speaking in the feeding room to the rear of the door 26. When supplying the feed, the rear doors 16 may be opened, after which it is made sure that the doors 26 are closed. The feed is then placed in front of the doors 26, after which the doors are propped partly open, to permit the egress and ingress of the bees. In other words the bees may come from behind the door and gather their feed, and return to the feeding rooms. Obviously by this construction the bees may pass from the feeding rooms to the compartment or space between the closures 19 and the doors 16.

The front of the housing or casing 1 is provided with a plurality of entrances or openings 28, and adjacent these openings are vertical guides 29, for the reception of the shutters 30, which are capable of moving perpendicularly in the guides. When the shutters (which are provided with handles 31) are lowered, their lower portions cover the lower entrances or openings 28 and prevent the ingress and the egress of the bees. The lower portions of the shutters 30 are provided with suitable air holes or apertures 32, to permit the circulation of air through the compartments. These entrances or openings 28 are just large enough to permit a bee at a time to pass therethrough, thereby insuring against entrance of mice and butterflies and the like, which may be attracted to the hive. The glass closures 18 and 19 are for the purpose of rendering it more convenient to remove the honey combs, and permitting one to work in and arrange frames in the honey rooms. Any number of frames 10, 11 and 12 may be arranged in the compartments, it depending entirely upon the size of the beehive. It will be noted that the breeding room contains approximately twenty frames, more or less, and due to this fact the bees are more prolific and will multiply faster.

The sides of the housing or casing is provided with suitable handles 34, whereby a housing may be moved from one place to another. The doors 16 are fastened closed as at 35.

In the warm weather, the shutters may be raised, in order to uncover the entrances or openings 28 (said shutters being held in different positions by friction), and toward the evening the shutters may be lowered, to close the entrances, that is to say after dark, permitting air to circulate into and through the hive, by way of the apertures or openings 32 which are formed in the lower edge or base of the shutters.

It will be noted that the honey room and the breedery room may be increased or decreased in size, by placing the closures 18 and 19 in different positions, so it is possible to breed a smaller stock or a greater stock. Also it will be noted that the space between the closures 18 and 19 and the outside doors 16 may contain cloth of some suitable character, in order to keep the breedery and honey rooms warm during the winter months.

The handles 31 on the shutters are in the form of nails, which may be driven partly into the wall of the housing, to hold the shutters closed. When the nails are withdrawn from the wall of the housing sufficient to permit the shutters to be raised, they may be used as handles, as previously stated.

The closures 18 and 19 are provided with rings or handles $18^a$, by which the closures 18 and 19 may be inserted and removed.

Supported upon the intermediate set of runners 5 are slides $10^a$, to which supports or platforms $10^b$ are hingedly connected as at $10^c$. When the doors 16 are closed, the slides $10^a$ are moved back on the runners, sufficient to permit the platforms or shelves $10^b$ to be folded or arranged in perpendicular positions, adjacent the inner faces of the doors 16. However when the doors 16 are open, the platforms or shelves may be arranged in horizontal positions, as shown in Figures 3 and 4, and when in these positions they are supported by the braces 10$^d$, which engage notches of the doors 16 and the platforms or shelves, as shown in Figure 3 clearly.

The invention having been set forth, what is claimed is:—

1. In a beehive, a housing open at its rear portion, doors hinged to the rear portion of the housing for closing the same, the front wall of the housing at the lower portion thereof having a series of openings, shutters slidable on the front wall of the housing for closing said opening, said shutters having ventilating openings, a partition disposed centrally of the housing and dividing the housing into two compartments, honey comb and breeding frames suspended in each compartment, inner window closure members disposed in the rear portion of each compartment for closing said compartment, said windows being disposed in spaced relation to the doors of the housing, the lower portion of the lower window closure member of each compartment co-acting with the partition and the housing to provide a feeding chamber, said lower portion of each window frame having an opening, a door hinged to the window frame for closing the opening whereby admission may be had to the compartments without removing the window closure members.

2. In a beehive, a housing open at its rear portion, doors hinged to the housing for closing said rear portion, a partition disposed in said housing and dividing said housing into two compartments, a plurality of cleats disposed in each compartment, honey comb and breeding frames suspended from said cleats, an upper window closure member for each compartment, the frame of said window closure member having recesses for the reception of the uppermost cleats, and a lower window frame closure member, the frame of said lower closure member being relatively long and having notches in its upper and central portion for the reception of the cleats of the compartment whereby said lower window closure member is prevented from canting in the compartment relative to the cleats, the lower portion of the lower window closure member having an opening, and a door for closing said opening, said lower portion of the lower closure member and door cooperating with the housing to provide a feeding compartment, that portion of the front wall of the compartment opposite the door of the window closure member being provided with entrance openings.

In testimony whereof I hereunto affix my signature.

MICHAEL DAVID.